United States Patent
Olivier (12)

(10) Patent No.: US 6,352,421 B1
(45) Date of Patent: Mar. 5, 2002

(54) MOLD FOR PRODUCING PARTIALLY EXPANDED BODIES WITH A PVC-BASED EMBRYO CELLULAR STRUCTURE

(76) Inventor: Giacoma Olivier, Via dei Zattieri, 38 - I, 32014 Ponte Nelle Alpi Belluno (IT)

( * ) Notice: Subject to any disclaimer, the term of this patent is extended or adjusted under 35 U.S.C. 154(b) by 0 days.

(21) Appl. No.: 09/504,379

(22) Filed: Feb. 15, 2000

(51) Int. Cl.$^7$ .................................. B28B 7/24
(52) U.S. Cl. ...................... 425/4 R; 249/129; 249/130
(58) Field of Search ................. 249/130, 129; 425/4 R, 352

(56) References Cited

U.S. PATENT DOCUMENTS

| | | | | |
|---|---|---|---|---|
| 2,496,755 A | * | 2/1950 | Schwartzberg | 249/130 |
| 2,587,852 A | * | 3/1952 | Jahn et al. | 249/130 |
| 4,333,897 A | * | 6/1982 | Hayashi et al. | 425/4 R |
| 4,608,213 A | * | 8/1986 | Kurumizawa et al. | 249/129 |
| 4,762,654 A | * | 8/1988 | Fuchigami et al. | 249/130 |
| 5,647,571 A | * | 7/1997 | Hupp | 249/129 |
| 6,113,379 A | * | 9/2000 | LaCroix et al. | 249/130 |
| 6,286,807 B1 | * | 9/2001 | Horimatsu et al. | 249/129 |

* cited by examiner

Primary Examiner—Allan R. Kuhns
(74) Attorney, Agent, or Firm—Browdy and Neimark PLLC

(57) ABSTRACT

The present invention relates to a method for producing partially expanded bodies with a PVC-based embryo cellular structure comprising the steps of filling a plurality of molds (1) with a paste containing PVC, loading these molds (1) onto a press provided with heating and cooling means designed to subject the paste to the combined action of an increase in pressure and variation in temperature, expansion of the paste inside the molds (1) and consequent forming of partially expanded bodies with an embryo cellular structure. In accordance with the present invention, during the expansion step, a step involving transfer of a first excess amount of paste from a main compartment (4) of the mold (1) to a secondary compartment (5) of the mold (1) takes place.

9 Claims, 1 Drawing Sheet

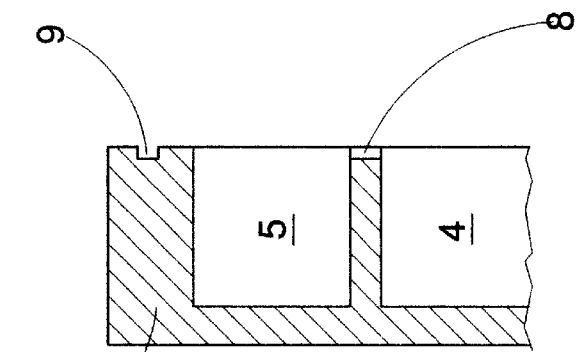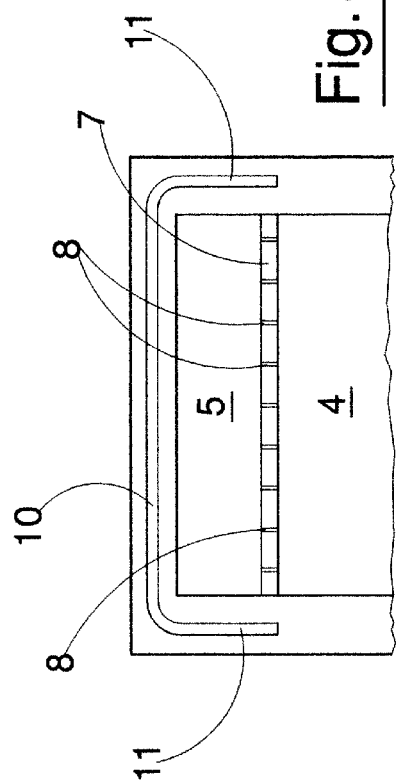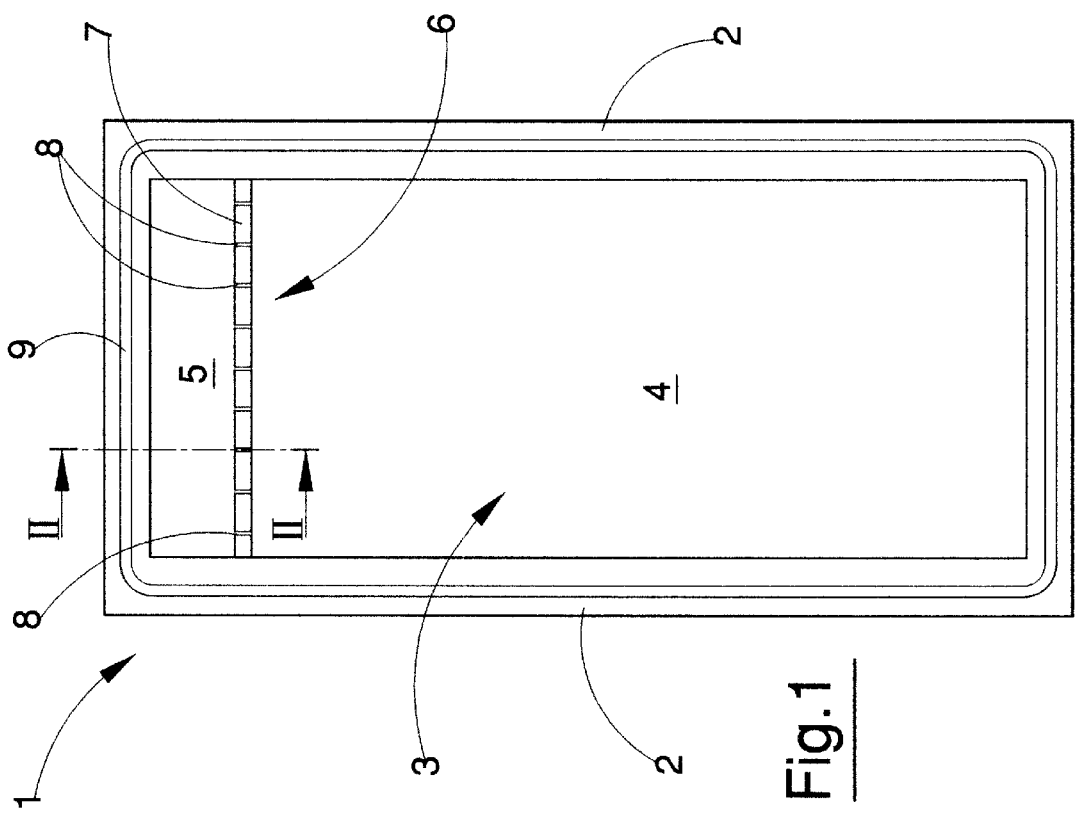

MOLD FOR PRODUCING PARTIALLY EXPANDED BODIES WITH A PVC-BASED EMBRYO CELLULAR STRUCTURE

BACKGROUND OF THE INVENTION

1. Field of the Invention

The present invention relates to a method for producing partially expanded bodies with a PVC-based embryo cellular structure and to a mold for the production of these bodies.

More precisely, the method and the mold which form the subject of the present invention are advantageously used for the production of partially expanded bodies (called "embryo cellular bodies" in the specific technical sector) which, as a result of subsequent chemical-physical treatment, can be used to obtain expanded products, mainly in the form of panels, which can be used as thermal/acoustic insulators in the building sector or for applications in the naval or aeronautic sector or also for imparting floating properties to boats, etc.

1. Description of the Prior Art

As is known, the production process which results in the manufacture of the panels envisages initially the formation of a paste consisting of a mixture of powders (PVC and other compounds) and liquid substances (in particular isocyanates).

Subsequently the paste is subjected to pressure, heating and subsequent cooling inside suitable molds from where the so-called "embryo cellular bodies" are then extracted. The latter, following further heat treatment in water or steam ovens, are further expanded as a result of the hydrolysis reaction of the isocyanate groups present in the material, giving rise to the formation of the panels.

At present, the methods for the production of "embryo cellular bodies" envisage filling the molds with quantities of pastes greater than that required (with an excess amount, in terms of weight, equal to about 8% of the product leaving the mold) so as to allow gaseous inclusions to escape from the molds during the heating step. In other words, the excess paste introduced into the molds allows, at the end of processing, panels with a perfectly regular shape, devoid of gaseous forms or cavities, to be obtained.

In accordance with a first known embodiment of a method and apparatus for the production of "embryo cellular bodies", the excess paste equivalent to 8% by weight emerges from the top edge of the mold. Generally this occurs after about 5–6 minutes from the start of heating of the molds following the increase in pressure which occurs inside them owing to the chemical reactions which develop in the pastes. Consequently there is a non-recoverable wastage of material (since at high temperature the PVC gelatinizes and the expanding substances deteriorate). At the same time the drawing off of the harmful vapors is necessary, with a consequent obvious increase in the production costs which have a negative effect on the cost of the final product.

More recently, in order to overcome at least partly these drawbacks, a second embodiment of a method and apparatus for the production of "embryo cellular bodies" has been devised, by means of which it is possible to recover and therefore re-use the excess paste introduced initially into the molds, thereby avoiding the wastage of material and the danger of environmental pollution caused by the evaporation of the iscyanates.

This second embodiment, which is described in the patent No. IT 1,242,873 and envisages the extraction of the excess paste during a step of the process involving heating of the paste in the molds, has in practice proved to have certain drawbacks.

In fact, it uses means for extraction of the excess paste which are costly, impractical, pose considerable maintenance problems and do not allow subsequently basically an optimum re-use of the excess paste.

SUMMARY OF THE INVENTION

The main object of the present invention is therefore that of overcoming the drawbacks associated with the methods and the molds of the known type by providing a new method for producing partially expanded bodies with a PVC-based embryo cellular structure which allows the recovery in a simple and low-cost manner of substantially all the excess paste introduced initially into the molds, avoiding at the same time wastage of material and risks of environmental pollution caused by the evaporation of the isocyanates.

A further object of the present invention is that of providing a mold for the production of these partially expanded bodies which allows recovery of the excess paste initially introduced inside it.

Another object of the present invention is that of providing a mold for the production of partially expanded bodies with a PVC-based embryo cellular structure, which is simple, reliable and does not require high maintenance costs.

BRIEF DESCRIPTION OF THE DRAWINGS

The technical characteristics of the invention, in accordance with the abovementioned objects, may be clearly understood from the contents of the claims indicated below and the advantages thereof will emerge more clearly from the detailed description which follows, with reference to the accompanying drawings, which show some purely exemplary and non-limiting embodiments in which:

FIG. 1 shows a schematic plan view of the mold according to the present invention;

FIG. 2 shows a side view, on a larger scale and in cross-section, of a portion of the mold according to FIG. 1;

FIG. 3 shows a partial schematic plan view of a portion of a variation of embodiment of the mold according to the present invention.

DETAILED DESCRIPTION OF THE PREFERRED EMBODIMENT(S)

In accordance with the figures of the accompanying drawings, 1 denotes, in its entirety, the mold according to the present invention.

The mold 1 has a substantially rectangular shape bounded perimetrally by a perimetral edge 2 (with a height of about 3 cm) which defines a containing area 3 of the mold 1. During a step for filling of the mold 1, a paste (in an excess amount equivalent to about 8% by weight) containing PVC, expanding substances, stabilizers and liquids containing isocyanates and, optionally, plasticizers is introduced inside this area 3. Each mold 1 is provided in a conventional manner with a rectangular shaped lid.

Then, the mold 1 (together with other molds) is placed, during a special loading step, onto a press (not shown in the accompanying figures in that of the known type) between heating and cooling plates which are designed to subject the paste to a combined action involving an increase in pressure and variation in temperature.

More particularly, when the press is closed, the heating produced by the plates (containing a heat-exchange coil inside) starts. In some cases, the heating may occur before the introduction of the molds 1 into the press.

The step involving expansion of the paste inside the molds 1 then takes place.

In this way, after a few minutes have passed by and the pressure inside each mold 1 has reached a threshold value, the passage, during a special transfer step, of a first excess amount of paste from a main compartment 4 to a secondary compartment 5 of each mold 1 occurs. For this purpose, each mold 1 (see FIG. 1) is provided with a separation baffle 6 which divides the containing area 3 into the two compartments, i.e. main compartment 4 and secondary compartment 5 mentioned above.

As can be seen in FIG. 2, the upper surface 7 of the separation baffle 6 has, formed in it, transverse grooves 8 which act as channels 8 connecting the main compartment 4 and the secondary compartment 5.

It should be noted that the excess paste (equivalent to about 8% by weight with respect to the weight of the product leaving the press at the end of the method), which is introduced inside the mold 1 at the end of the filling step, is necessary for allowing the escape of the gaseous inclusions during the step involving expansion (and heating) of the paste inside the mold 1. In other words, in the molding methods using these PVC-based materials, this excess paste (i.e. of the order of 7–9%) allows products with a regular form to be obtained at the end of processing.

In accordance with the subject of the present invention, the method for producing partially expanded bodies with an embryo cellular structure therefore envisages a step involving expansion of the paste in the main compartment 4 and simultaneous expansion of the excess in the secondary compartment 5. Consequently, a forming step takes place, resulting in the formation of a main body (not shown) inside the main compartment 4 and a secondary body (also not shown) inside the secondary compartment 5.

As can be seen from the plan view of the mold 1 illustrated in FIG. 1, the secondary compartment 5 has smaller dimensions than the main compartment 4. This is so because the secondary compartment 5 must receive only the first excess amount of paste of the main compartment which is equivalent to about 8% by weight of the paste originally introduced into the mold 1.

In turn the secondary compartment 5, in order to produce an embryo cellular secondary body which is regular and devoid of gaseous inclusions, also needs to discharge about 8% of the paste which fills it, i.e. about 8% of the first excess amount of paste. Therefore, it has to discharge externally a second excess amount of paste which therefore amounts to about 0.64% of the paste originally introduced into the mold 1.

It is obvious that already with the division of the mold into two compartments a practically negligible wastage of paste is achieved.

In particular, as a result of this, it is not necessary to provide costly disposal systems which for example perform long and complex treatment of the production waste using hot water or steam so as to allow complete reaction of the isocyanates.

Advantageously, discharging of the second excess amount of paste takes place during the expansion and subsequent forming step inside a perimetral groove 9 formed on top of the perimetral edge 2 of the mold 1. In accordance with a preferred embodiment of the invention, the groove 9 may advantageously be formed only in the secondary compartment 5. In this case, as can be seen from the accompanying FIG. 3, the groove 9 has a section 10 which is arranged parallel to the long side of the secondary compartment 5 and two short sections 11 which are arranged parallel to the two short sides of the secondary compartment 5.

What is claimed is:

1. Mold for the production of partially expanded bodies with a PVC-based embryo cellular structure, which can be charged with a paste containing PVC, expanding substances, stabilizers and liquids containing isocyanates and which can be used in a press operationally associated with heating and cooling means which are designed to subject said paste to the combined action of an increase in pressure and variation in temperature, said mold (1) being peripherally bounded by a perimetral edge (2) designed to define a containing area (3) for receiving said paste and producing said partially expanded bodies with an embryo cellular structure, wherein the containing area of said mold (1) is divided by a separation baffle (6) into at least two compartments, a main compartment (4) and a secondary compartment (5), which communicate with each other by means of connection channels (8) formed on said separation baffle (6).

2. Mold as claimed in claim 1, wherein said secondary compartment (5) has dimensions smaller than those of said main compartment (4).

3. Mold as claimed in claim 1, wherein said main compartment (4) discharges via said connection channels (8) a first excess amount of paste into said secondary compartment (5).

4. Mold as claimed in claim 3, wherein said first excess amount of paste is equivalent to 7–9% by weight of the paste originally introduced inside said mold (1).

5. Mold as claimed in claim 1, wherein said secondary compartment (5) discharges externally a second excess amount of paste equivalent to 7–9% by weight of the paste originally discharged inside it from said main compartment (4).

6. Mold as claimed in claim 1, wherein said connection channels (8) consist of transverse channels formed on the upper surface (7) of said separation baffle (6).

7. Mold as claimed in claim 1, wherein a perimetral groove (9) is formed on top of said perimetral edge (2).

8. Mold as claimed in claim 7, wherein said secondary compartment (5) discharges said second excess amount of paste into said perimetral groove (9).

9. Mold as claimed in claim 7, wherein said groove (9) is formed on the perimetral edge (2) only in the region of said secondary compartment (5).

\* \* \* \* \*